United States Patent [19]

Ishii et al.

[11] 4,417,167

[45] Nov. 22, 1983

[54] DC BRUSHLESS MOTOR

[75] Inventors: Hirohisa Ishii, Tokyo; Masami Shishikura, Yokohama; Toshihiko Okamura, Tokyo, all of Japan

[73] Assignee: Sony Corporation, Tokyo, Japan

[21] Appl. No.: 329,887

[22] Filed: Dec. 11, 1981

Related U.S. Application Data

[63] Continuation of Ser. No. 942,270, Sep. 14, 1978, abandoned.

[30] Foreign Application Priority Data

Sep. 14, 1977 [JP] Japan .................. 52-111298

[51] Int. Cl.³ ............................. H02K 7/00
[52] U.S. Cl. ...................... 310/67 R; 310/156
[58] Field of Search .................... 310/152–156, 310/67, 266

[56] References Cited

U.S. PATENT DOCUMENTS

3,296,471  1/1967  Cochhardt .................. 310/154
3,564,306  2/1971  Ott .......................... 310/67 X

*Primary Examiner*—Don Duggan
*Attorney, Agent, or Firm*—Lewis H. Eslinger; Alvin Sinderbrand

[57] ABSTRACT

In a DC brushless motor including a rotor assembly having permanent magnets and a stator assembly having coils arranged in the magnetic field generated by the permanent magnets of the rotor assembly, with the energization of the coils being controlled so as to impart a rotational torque to the rotor assembly; the permanent magnets of the rotor assembly are flat and are attached to a rotor yoke, which can be constructed as an octagonal prism, to provide a path for the magnetic flux emanating from the magnets and to support the flat magnets so that the latter form substantially a regular polygon in cross section. The magnets can be arranged with their poles in a north-south-north-south sequence against flat side walls of the rotor yoke to provide a flux density pattern that is substantially sinusoidal. Alternatively, the flat magnets can be arranged so that magnets of like polarization are disposed on either side of selected corners of a polygonal rotor yoke, thereby providing a flux density pattern that is substantially trapezoidal or rectangular.

20 Claims, 22 Drawing Figures

DC BRUSHLESS MOTOR

This application is a continuation of application Ser. No. 942,270, filed Sept. 14, 1978, now abandoned.

BACKGROUND OF THE INVENTION

1. Field of the Invention

This invention relates to DC brushless motors, and more particularly related to an improved rotor assembly of DC brushless motors constituted by a magnetic path-forming rotor yoke and one or more permanent rotor magnets.

DESCRIPTION OF THE PRIOR ART

In a conventional DC brushless motor, a permanent-magnet rotor assembly is provided with a cylindrical magnet or with a number of arcuate magnets arranged with a cup-shaped iron rotor yoke. A stator including coils and associated electrical circuitry is fixedly arranged within the rotor so as to interact with the latter and impact a rotational torque thereto.

Certain problems arise in motors using such cylindrical or arcuate magnets which are typically formed of sintered ferrite and have the crystals thereof in either an isotropic or anisotropic orientation. A cylindrical magnet formed of anisotropic ferrite can be magnetized along the direction of the anisotropic orientation (sometimes called the "easy magnetization direction") so as to provide a large flux density in that direction. However, it is only possible to form such an anisotropically oriented magnet with its crystal axes arranged so that the directions of the anisotropic orientation are parallel throughout the magnet. In other words, it is impossible to form a cylindrical magnet in which the directions of anisotropic orientation are radial. Therefore, in an anisotropic cylindrical magnet, if the direction of magnetization is substantially radial, the cylindrical magnet will exhibit a comparatively high flux density at those places where the direction of magnetization is aligned with the anisotropic orientation, and a comparatively smaller flux density at the orthogonally spaced locations where the direction of magnetization is substantially at right angles to the direction of anisotropic orientation. As a result, DC brushless motors incorporating a cylindrical, anisotropically oriented rotor magnet are subject to substantial torque ripple.

Although an isotropic magnet is magnetizable so that the magnetic flux density is substantially independent of crystal orientation, the flux density provided thereby is substantially smaller than that of an anisotropically oriented magnet. Therefore, a motor incorporating an isotropic magnet will not provide as high a torque as one incorporating an anisotropic magnet.

It is possible to somewhat reduce the foregoing problems by providing the rotor assembly with a plurality of magnets which are arc-shaped segments of a cylinder. In such case, it is possible to form each arc-shaped magnet with anisotropic orientation, and with the direction of anisotropy being parallel throughout each magnet, rather than being directed in the true radial direction. As a result, a rotor containing such arc-shaped magnets has a flux density that substantially conforms to a sinusoidal curve with a flattened portion at the center of each magnet. A DC motor with such a rotor is still subject to torque ripple.

In addition, each cylindrical or arcuate ferrite magnet must be molded into such shape, and then the molded ferrite is sintered. As it is impossible to form such a sintered ferrite magnet to exact dimensions, it is necessary to grind the inner and outer circumferential surfaces of each magnet in order to attain inner and outer diameters of desired accuracy. Separate kinds of grinding tools are required for finishing the inner and outer circumferential surfaces. As a result, the manufacturing cost of such magnet is greater than the cost of material therefor, and the cost of the overall product becomes quite high.

Moreover, cylindrical and arcuate ferrite magnets are fragile and must be handled with care from the time of production until such time as the magnets are assembled in the motors.

It is also apparent that various applications for DC brushless motors require motors of different sizes which in turn each require specially formed rotor magnets. For instance, various kinds of cylindrical or arcuate magnets may be required to provide motors with a specified number of poles or with a rotor of a certain diameter, and, as a result, cylindrical or arcuate magnets of varying diameters and varying angular extents must be produced for incorporation in various motors. Thus, it is difficult to standardize the magnets to be used in various motors.

Furthermore, in such conventional DC motors, rotational dynamic balance of the rotor assembly is typically achieved by adding weight, for example, as provided by a lead powder mixed in plastic adhesive, to the upper portion or to the lower portion of the rotor magnet. Such application of balancing weight to the rotor magnet is disadvantageous in that it interferes with minimizing the size of the motor, and is restrictive in respect to the design of the rotor magnet.

OBJECTS AND SUMMARY OF THE INVENTION

Accordingly, it is an object of this invention to provide a DC brushless motor which can be constructed at relatively low cost and which avoids the above-mentioned disadvantages of conventional DC motors.

Another object of this invention is to provide a DC brushless motor which can be easily manufactured.

A further object of this invention is to provide a DC brushless motor which employs accurately dimensioned permanent magnets in its rotor.

A still further object of this invention is to provide a DC brushless motor in which permanent magnets of standardized size and shape can be used.

Yet another object of this invention is to provide a DC brushless motor in which the magnetic flux distribution of the rotor with respect to the angle of rotation thereof can be easily tailored to a desired flux density pattern.

A still further object of this invention is to provide a DC brushless motor in which the generated rotational torque exhibits relatively little ripple.

A still further object of this invention is to provide a DC brushless motor in which the rotor can be easily and accurately balanced dynamically.

In accordance with an aspect of this invention, in a DC brushless motor which comprises a permanent magnet rotor assembly, a stator assembly having coils arranged in the magnetic field generated by the permanent magnet rotor assembly and control circuitry to control energization of the coils so as to impart a rotational torque to the rotor assembly; the rotor assembly includes a plurality of flat permanent magnets and a rotor yoke providing a path for the magnetic flux emanating from the magnets and supporting the flat magnets so that the latter form an array which is substantially a regular polygon in cross-section. Preferably, the rotor yoke is itself a right-polygonal prism having a plurality of flat side walls to which the flat permanent magnets are attached. The flat magnets can be made of anisotropic material and magnetized so that magnetic flux flows from one flat surface and into the opposite flat surface. The magnets are thus arranged so that the surfaces facing in the radial direction with respect to the axis of rotation of the rotor assembly are north or south magnetic poles.

In one embodiment, the flat magnets are arranged on the flat walls of the rotor yoke so that successive magnets arranged on successive flat walls alternate in polarity, thereby creating a flux distribution which varies sinusoidally with respect to the angle of rotation of the rotor assembly, and which is therefore suitable for use in a two-phase DC brushless motor.

In another embodiment, the permanent magnets are arranged so that magnets on the flat side walls at opposite sides of at least certain corners formed by the intersections of these flat side walls are of the same polarity. This arrangement provides a flux distribution that is substantially constant over predetermined angular ranges with respect to the angle of rotation of the rotor assembly. The angular ranges of substantially constant flux density are centered about the angular positions of the mentioned corners. A rotor assembly having such a flux density is suitable for use in a multiple-phase DC brushless motor. In one variation of the foregoing embodiment, the flat magnets are arranged so that a pair of magnets of the same polarity are arranged on two successive flat walls of the rotor yoke, and then a pair of magnets of the opposite polarity are arranged on the next two successive flat walls, thus providing a trapezoidal flux distribution. In another variation, the flat magnets are formed to each include north- and south-polarized portions, and the magnets are arranged on the successive flat side walls so that the north-polarized portions of two successive magnets are at opposite sides of one corner, while the south-polarized portions are nearer the next corners. The foregoing arrangement provides a flux distribution that is substantially rectangular.

In any of these embodiments, balancing weights can be attached either as laminar plates affixed to flat portions of the rotor yoke, or as suitably shaped weights attached in corners of the rotor yoke.

The above, and other objects, advantages and features of this invention, will become apparent from the following detailed description which is to be read in conjunction with the accompanying drawings.

DETAILED DESCRIPTION OF THE PREFERRED EMBODIMENTS

Figure 1A:
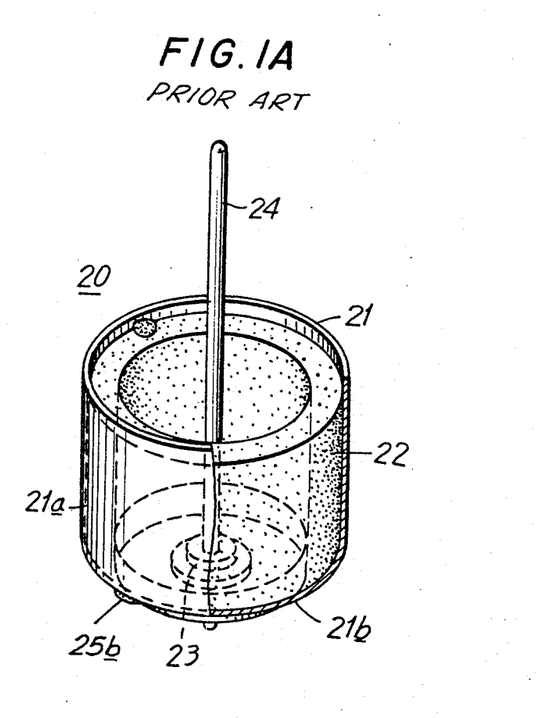
FIG. 1A is a perspective view of a rotor assembly according to the prior art.

For purposes of contrast with the present invention, a conventional rotor assembly for a DC brushless motor will first be described with reference to FIG. 1A. In such conventional rotor assembly 20, a cup-shaped rotor yoke 21 has a cylindrical side wall 21a and a circular bottom wall 21b. The yoke 21 is typically made of iron and drawn into the shape of a cup. A cylindrical magnet 22 is attached to the inside of cylindrical side wall 21a. A boss 23 is formed in the bottom wall 21b for joining a rotor shaft 24 thereto. A stator assembly, not shown, can then be arranged inside the cylindrical magnet 22 and fixed to a motor casing, which is also not shown.

Figure 1B:
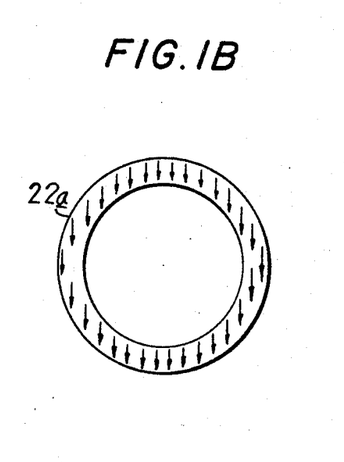
FIGS. 1B–1D are diagrammatic plan views of cylindrical magnets for use in the prior art rotor assembly of FIG. 1A.

The cylindrical permanent magnet 22 is typically made of ferrite. The crystallographic orientation of magnet 22 can be anisotropic, as shown on FIG. 1B, or isotropic as shown on FIG. 1C. In the case of the anisotropic orientation shown on FIG. 1B, the rotor magnet 22a will provide relatively high flux density when the direction of magnetization is aligned with the direction of anisotropic orientation, but will provide a smaller flux density when the direction of magnetization is at an angle to the direction of anisotropic orientation. The rotor magnet 22a is typically magnetized so that the direction thereof is substantially radial. Thus, it is apparent that the flux density will be a maximum at those portions of the magnet where the direction of anisotropic orientation coincides with the radial direction, for example, at the top and bottom of magnet 22a as viewed on FIG. 1B, but will be reduced at those portions of the magnet where the direction of anisotropic orientation coincides with the circumferential direction, for example, as at the opposite sides of magnet 22a as viewed on FIG. 1B. The torque produced at the portions of reduced flux density will be similarly reduced, with the result that the motor efficiency will also be reduced. Moreover, because of variations in torque with rotational angle, the DC brushless motor incorporating the rotor magnet 22a is subject to significant torque ripple.

Figure 1C:
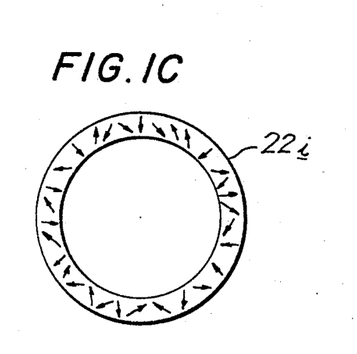

The isotropically oriented permanent magnet 22i of FIG. 1C cannot provide flux densities as large as that of the anisotropically oriented magnet 22a (FIG. 1B) and hence such isotropically oriented magnet 22i provides a lower torque, and does not provide acceptable performance for all motor applications.

Figure 1D:
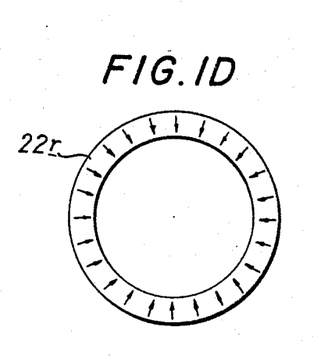

When a ferrite cylindrical magnet is formed, the crystal axes of the ferrite material tend to align themselves along parallel lines. Thus, it is technically difficult if not impossible to provide an ideal cylindrical magnet, as indicated at 22r on FIG. 1D, with an anisotropic orientation in the radial direction.

Figure 2A:
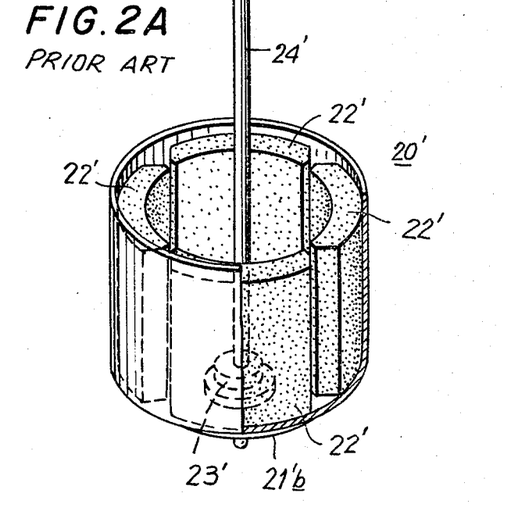
FIG. 2A is a perspective view of another rotor assembly according to the prior art.

FIG. 2A shows another conventional rotor assembly 20' in which four arc-shaped or segmental magnets 22' are disposed in the cup-shaped rotor yoke 21'. In the example of FIG. 2A, elements corresponding to those described above with reference to FIG. 1A are identified by the same reference numerals, but with primes appended thereto, and a detailed description thereof is omitted.

In the case of a four-pole, three-phase DC brushless motor, the rotor assembly 20' is provided with the above mentioned four magnets 22', and each magnet subtends an angle of substantially 90° with respect to the rotor shaft 24'. The magnets 22' are magnetized so that either the north or the south pole faces substantially inward toward the rotor shaft 24'. As in the case of the cylindrical magnet 22, an anisotropically oriented segmental magnet 22'a (FIG. 2B) can be formed only with the anisotropic orientation direction being parallel throughout each magnet. It is impossible to produce the magnet 22'r of FIG. 2C with the anisotropic orientation direction being arranged radially. As a result, the practical arc-shaped or segmental magnets 22'a suffer from substantially the same defects as the cylindrical magnet 22a of FIG. 1B, albeit to a lesser extent.

Figure 2B:
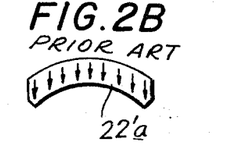
FIGS. 2B and 2C are diagrammatic plan views of magnets for use in the rotor assembly of FIG. 2A.
Figure 2C:
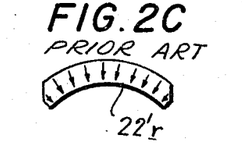

Whenever the arc-shaped or segmental magnets 22'a of FIG. 2B are used, the direction of the anisotropy orientation can be substantially radial only at the center portion of each magnet 22'a but has a significant component in the circumferential direction at each side edge thereof. Thus, the distribution of the radial component of magnetic flux, with respect to the angle of rotation of the rotor assembly 20', corresponds to substantially a sinusoidal curve which is slightly flattened at the regions of maximum and minimum amplitudes. Therefore, in a DC brushless motor incorporating such arc-shaped magnets, resultant torque is provided with significant ripple.

If each magnet 22' is magnetized so that the magnetic flux density is reduced over the central portion and increased at the opposite sides thereof, with the result that the flux distribution exhibits a trapezoidal form, torque ripple may be reduced, but at a significant sacrifice in flux density, thus resulting in smaller torque output.

Moreover, the described cylindrical and arc-shaped magnets 22, 22' are formed of ferrite, which must be molded into the desired shape for each magnet. The molded ferrite is then sintered to form a ferrite magnet. A sintered ferrite magnet is difficult to dimension accurately, and the inner and outer circumferential surfaces thereof must be ground to obtain the desired accuracy of the inside and outside diameters. To effect such grinding, at least two types of grinding tools are required to grind the inside and outside surfaces, respectively, of the cylindrical or arc-shaped magnets 22, 22'. As a result of such complex manufacturing operation, the manufacturing cost of the prior art magnets is significantly greater than the cost of materials, with the result that the total cost of the magnets 22, 22' is quite high. In addition, it should be noted that the manufacturing process for forming a cylindrical magnet is extremely intricate, so that cylindrical magnets 22 can be produced only at a particularly high cost.

Such cylindrical or arc-shaped ferrite magnets are also quite fragile, and each such magnet must be handled with extreme care during manufacturing and storage until such time as the magnet is assembled in a motor.

In addition, various applications require motors of various sizes and various characteristics, and, therefore, cylindrical or arc-shaped magnets of different diameters and different central angles must be prepared for the various motors. Thus, with conventional cylindrical or arc-shaped permanent magnets 22, 22', it is impossible to use a standardized magnet that can be employed in a number of different motors. Moreover, practical considerations limit the size of the magnet 22, 22' that it is possible to produce.

Returning to FIG. 1A, it will be seen that dynamic balancing weights 25a, 25b are provided on rotor assembly 20 to effect rotational balance thereof. In this instance, a balancing weight composed of lead powder in mixture with an adhesive compound is deposited on an upper portion of magnet 22, as at 25a, and/or on a peripheral edge of the bottom wall 21b, as at 25b.

As is apparent, the location of such weights 25a, 25b makes it difficult to minimize the size of the motor and also makes it difficult to minimize the design size of the magnet.

Figure 3:
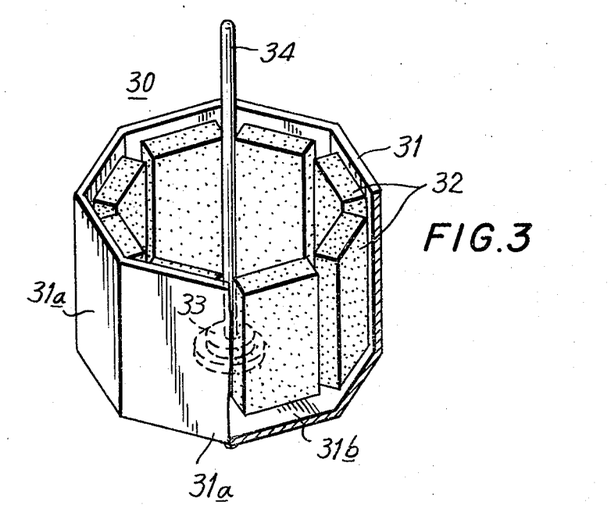
FIG. 3 is a partly broken-away perspective view of a rotor assembly according to an embodiment of this invention.

An embodiment of the present invention will now be described with reference to FIG. 3, in which a rotor assembly 30 is shown to include a rotor yoke 31 which consists of eight flat side walls 31a and an octagonal base plate 31b. Thus, the rotor yoke 31 is an octagonal prism, conveniently formed as a dup drawn from iron, electrical steel, or other ferromagnetic metal. Individual flat magnets 32 are arranged on the flat side walls 31a of rotor yoke 31. The magnets 32 thus form an array that is substantially octagonal in cross-section. A boss 33 is disposed at the center of the octagonal base plate 31b and a rotor shaft 34 is affixed to boss 33.

Figure 4A:
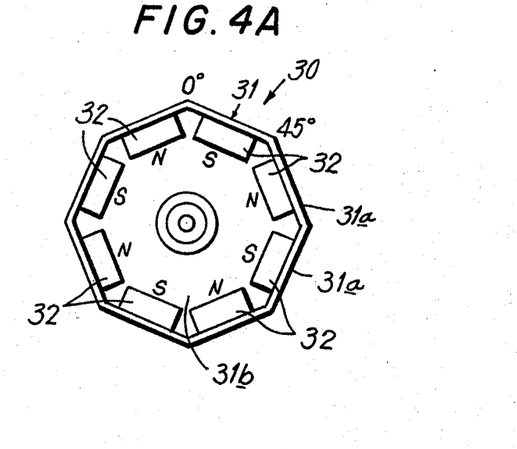
FIG. 4A is a plan view of the rotor assembly of FIG. 3.

As shown in FIG. 4A, in a rotor assembly according to this invention, the magnets 32 can be arranged to provide a flux density that varies sinusoidally with respect to the rotational angle of the rotor assembly. In the embodiment of FIG. 4A, each of the flat permanent magnets 32 is polarized so that magnetic flux flows into one flat surface thereof and out of an opposite flat surface. The flat permanent magnets 32 are arranged with the flat surface facing substantially radially with respect to the axis of rotation of the rotor assembly 30. Further, in FIG. 4A, permanent magnets 32 with their north poles facing towards the axis of rotation of the rotor assembly 30 are arranged on every other flat side wall 31a of the rotor yoke 31, and permanent magnets with their south poles facing towards the axis of rotation of the rotor assembly 30 are arranged on the remaining flat side walls 31a of the rotor yoke 31. That is, in this embodiment the magnets are arranged S—N—S—N . . . . Due to the flat character of each magnet 32, the distance from the rotor shaft 34 to each magnet is larger at the sides of each magnet 32 than at the center thereof. Thus, the gap between the inner surface of each of the magnets 32 and an associated stator armature disposed in rotor assembly 30 increases in proportion to the angular distance from the center of the magnet 32, and, the rotor assembly 30 exhibits a substantially sinusoidal flux density distribution pattern, as shown in FIG. 4B.

Figure 4B:
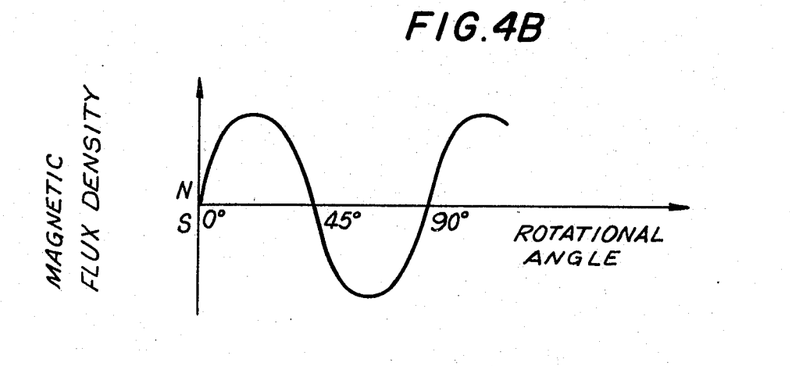
FIG. 4B is a graph showing the flux distribution of the rotor assembly of FIG. 4A.
Figures 4C, 4D:
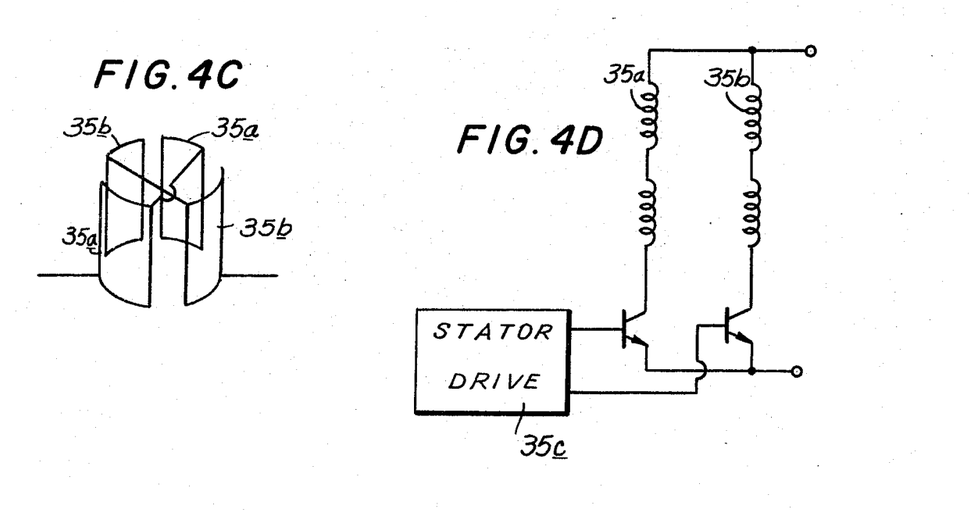
FIG. 4C is a schematic view of a stator armature for use with the rotor assembly of FIG. 4A.
FIG. 4D is a simplified circuit diagram of the stator armature of FIG. 4C.

A rotor assembly with the sinusoidal flux distribution pattern of FIG. 4B is advantageous for use in a two-phase DC brushless motor, in which a constant rotational torque is provided to the rotor assembly 30 by supplying sinusoidal current to stator armature coils 35a and 35b as shown in FIG. 4C and FIG. 4D. In such a DC brushless motor, a first pair of stator armature coils 35a are connected in series and the coils are separated from each other by an electrical angle equal to a multiple of $2\pi$, and a second pair of such stator armature coils 35b are connected in series and are also separated from each other by an electrical angle of a multiple of $2\pi$. The coils 35b are separated from the coils 35a by an electrical angle of an odd multiple of $\pi/2$. A conventional stator drive control circuit 35c, as shown in FIG. 4D, controls the current to each of the sets or pairs of coils 35a, 35b so that the current flowing through each of the armature coils 35a, 35b varies sinusoidally as a function of the angular position of rotor assembly 30. As rotor assembly 30 turns under the influence of stator armatures 35a and 35b, magnetic flux $B_a$ and $B_b$ of rotor assembly 30 links with the armature coils 35a and 35b, respectively, as expressed in the following equations:

$B_a = B_0 \sin\theta$; and $B_b = B_0 \cos\theta$, where $B_0$ is a constant, and $\theta$ is the rotational angle of the rotor assembly 30. Currents $i_a$ and $i_b$ flowing through armature coils 35a and 35b, respectively, can be expressed as $i_a = K \sin\theta$;

$i_b = K \cos\theta$, where K is a constant. The resultant torque T acting on the rotor assembly 30 can thus be expressed as the total torque which is the product of the current $i_a$, $i_b$ flowing through armature coils 35a, 35b, times the linking flux $B_a$, $B_b$ passing through the respective coils:

$T = B_a i_a + B_b i_b = B_0 K \sin^2\theta + B_0 K \cos^2\theta = B_0 K$.

Thus, the torque $B_0 K$ acting on rotor assembly 30 is substantially constant regardless of the rotational angle $\theta$ of the rotor assembly 30, and there is a substantial reduction in the torque ripple as compared with conventional DC brushless motors.

Figure 4E:
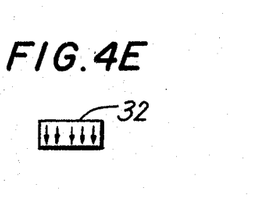
FIG. 4E is a plan view of a flat blade magnet for use in the rotor assembly of FIG. 4A.

As shown in FIG. 4E, the block or flat magnets 32 are arranged with the direction of anisotropic orientation perpendicular to the flat sides thereof as indicated by the arrows on FIG. 4E. The magnet 32 is then magnetized in the direction of the anisotropic orientation. Since the central angle for each block magnet 32 is relatively small, that is, the sides of each magnet 32 subtend a relatively small angle with respect to the axis of rotation, the magnetic flux can be considered to be directed in the radial direction. Thus, a relatively high magnetic flux can be produced, which can be used effectively for generation of rotational torque. From the foregoing, it follows that the embodiment of the invention described with reference to FIGS. 4A–4E provides an increased efficiency in operation of the motor.

Figure 5A:
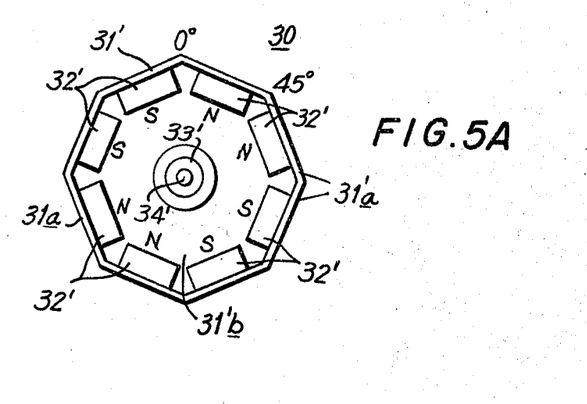
FIG. 5A is a plan view similar to that of FIG. 4A, but showing a rotor assembly according to another embodiment of the invention.
Figure 5B:
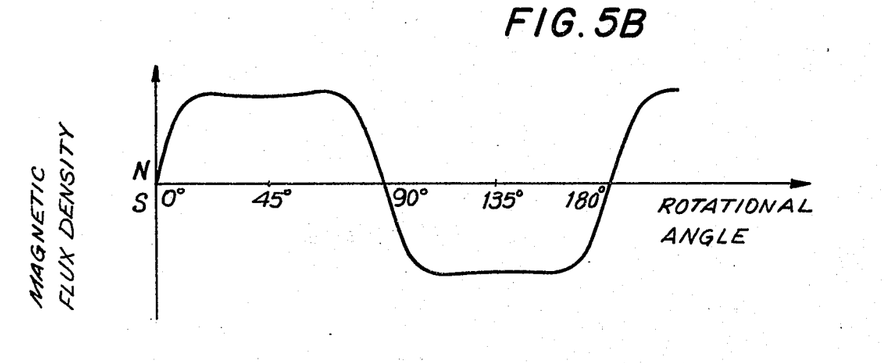
FIG. 5B is a graph showing flux distribution of the rotor assembly of FIG. 5A.

FIG. 5A shows another embodiment of this invention in which elements in common with those of the embodiments of FIG. 4A are identified by the same reference numerals, but with primes attached, and a detailed description thereof is omitted. The rotor assembly 30' of FIG. 5A is particularly suitable for use in a four-pole, three-phase motor, and is similar to the rotor assembly 30 of FIG. 4A, except for the arrangement of the polarities of the flat permanent magnets 32'. In the embodiment of FIG. 5A, the flat permanent magnets 32' are arranged so that magnets 32' at opposite sides of at least certain corners formed by the intersections of flat side walls 31a' of rotor yoke 31' are of the same magnetic polarity. As a result, the flux distribution of the magnetic field of rotor assembly 30' is substantially constant over predetermined angular ranges with respect to the angle of rotation of the rotor assembly 30'. As particularly illustrated on FIG. 5A, the flat permanent magnets 32' are arranged on the flat side walls 31a' of rotor yoke 31' so that pairs of permanent magnets of north polarity are arranged in succession with each magnet of that pair on a respective one of two consecutive flat side walls 31a'. In other words, the pole arrangement or sequence of the magnets 32' of rotor assembly 30' is in the order S—S—N—N—S—S . . . . As with the embodiment of FIG. 4A, the gap length between the magnets 32' and the associated stator is greatest near the corners adjacent to which there are magnets 32' of like polarity. A substantially flat flux distribution is provided which is centered about the angular position of each of such corners, corresponding to rotational angles of 45°, 135°, and so forth. At the corners between magnets 32' of opposite polarities, such magnets 32' are spaced somewhat apart from each other, and because the gap length also increases near such corners, the flux distribution of the rotor assembly 30' exhibits the trapezoidal form shown in FIG. 5B.

Figure 5C:
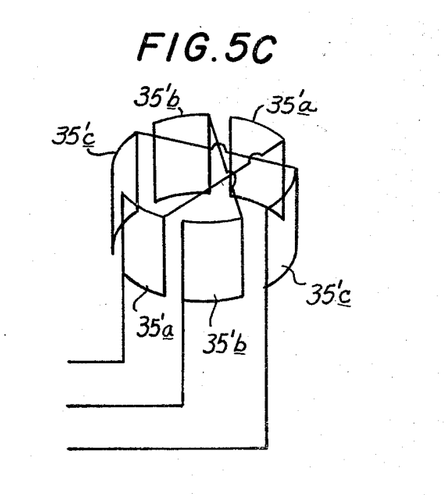
FIG. 5C is a schematic diagram of a stator armature for use with the rotor assembly of FIG. 5A.
Figure 5D:
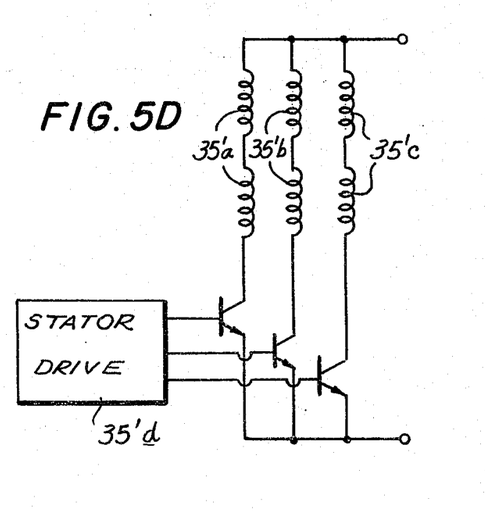
FIG. 5D is a simplified circuit diagram of the stator armature of FIG. 5C.

As shown in FIG. 5C and FIG. 5D, a stator armature for a four-pole, three-phase brushless motor including the rotor assembly 30', includes three pairs of stator coils 35'a, 35'b, 35'c, with each pair of coils being connected in series, as shown in FIG. 5D. A conventional stator drive control circuit 35'd energizes each set or pair of coils 35'a, 35'b, 35'c, in turn, over an angular range of 120 electrical degrees, that is, over a rotational angle of 60 degrees, so that the flat portion of the trapezoidal flux density curve shown on FIG. 5B can be used to generate a rotational torque which has relatively little ripple.

Figure 6A:
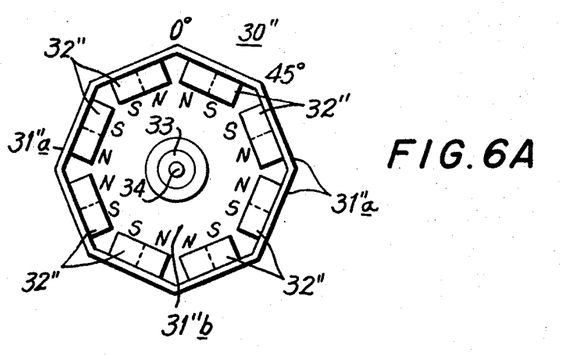
FIG. 6A is another plan view similar to that of FIG. 4A, but showing a rotor assembly according to still another embodiment of the invention.
Figure 6B:
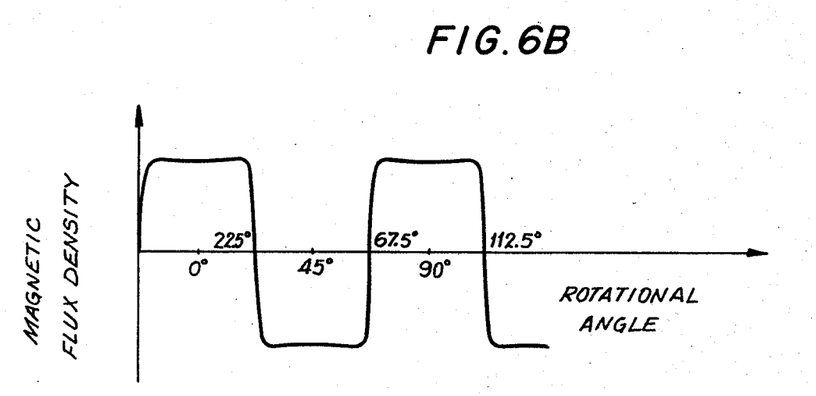
FIG. 6B is a graph showing flux distribution of the rotor assembly of FIG. 6A.

FIG. 6A shows a further embodiment of a rotor assembly 30" according to this invention, and in which those elements in common with the embodiments of FIGS. 4A and 5A are identified by the same reference numerals, but double-primed, and a detailed description thereof is omitted. The rotor assembly 30" is particularly useful for an eight-pole, three-phase brushless motor, and the construction of rotor assembly 30" is shown to be identical with that of FIGS. 4A and 5A, except for the arrangement of the polarities of the flat permanent magnets 32". In the rotor assembly 30", as in the rotor assembly 30' of FIG. 5A, adjacent portions of the permanent magnets 32" at opposite sides of at least certain corners formed by the intersections of flat side walls 31a" of the rotor yoke 31" are of like magnetic polarity. However, in this embodiment, each permanent magnet 32" consists of a pair of flat, oppositely-polarized magnets formed integrally with each other, and having a north magnetic polarization at the portion nearer a respective corner of the rotor yoke 31, and a south magnetic polarization at the portion remote from the respective corner of the rotor yoke 31. Thus, in this embodiment, the polarity of the permanent magnets 32" is reversed at each corner in succession, and the magnetic flux density pattern provided from the rotor assembly 30" has a flat portion at each angular position corresponding to a corner. The pole arrangement or sequence of the rotor assembly 30" is in the order of NS—SN—NS— . . . . In this arrangement, the gap length is greatest at the angular positions corresponding to the corners, where the magnets 32" of like polarity are adjacent each other. Thus as shown on FIG. 6B, the flux density curve is comparatively flat over a predetermined angular range on either side of each corner, corresponding to angular positions of 0°, 45°, 90°, and so forth. However, the direction of the magnetic flux changes abruptly at the boundary between the north- and south-magnetized portions of each magnet 32", which corresponds to the position where the magnetic gap length is smallest, that is, at angular positions of 22.5°, 67.5°, 112.5°, and so forth. Thus, the flux distribution exhibits a substantially rectangular shape, as on FIG. 6B. Here, the entire flat portion of the flux distribution curve can be used to generate rotational torque, and a motor of relatively high power with relatively little torque ripple can be provided.

In the embodiment of FIG. 6A, two discrete, oppositely-polarized magnets may be used in lieu of the single, integrally-formed magnet 32".

It should be noted that the flat block magnets 32, 32', 32" in the above embodiments can lower the cost and simplify the construction of the rotor assemblies 30, 30', 30". Such flat block magnets 32, 32', 32" can be mass-produced by simply cutting the same from a large plate magnet. The grinding process for providing accurately-dimensioned magnets may be performed simultaneously on both the inner and outer surfaces of the flat block magnets 32, 32', 32". Furthermore, the grinding process can be performed with only a single grinding tool to grind all the flat surfaces on each magnet. As a result, the desired accuracy of dimension can be obtained at a substantially reduced manufacturing cost. Furthermore, flat permanent block magnets 32, 32', 32" of a standardized size and shape can be used in various types of motors in which the rotor assemblies 30, 30' or 30" have different numbers of side walls and/or different diameters. Also, as each magnet is flat, mechanized handling of such magnets 32, 32', 32" is easy to achieve and, thus, the assembling of rotor assemblies according to this invention can be easily automated. Also, because the flat magnets 32, 32', 32" are easily handled, there is a considerably smaller possibility of breakage during the production of DC brushless motors according to this invention.

The present invention also helps simplify the positioning of each rotor magnet 32, 32' or 32" within the rotor yoke 31, 31' or 31". Because the rotor yoke 31, 31' or 31" of the present invention has a number of side walls 31a', 31b', 31c' forming a prism of polygonal cross-section and a polygonal bottom wall 31b, 31b', 31b", the rotor yoke 31, 31', 31", can be easily formed as a single unit. Then, the flat permanent block magnets 32, 32', 32" can be easily secured to the flat walls of the yoke 31, 31', 31" and the accurate positioning of such magnets 32, 32', 32" can be easily achieved.

Figure 7:
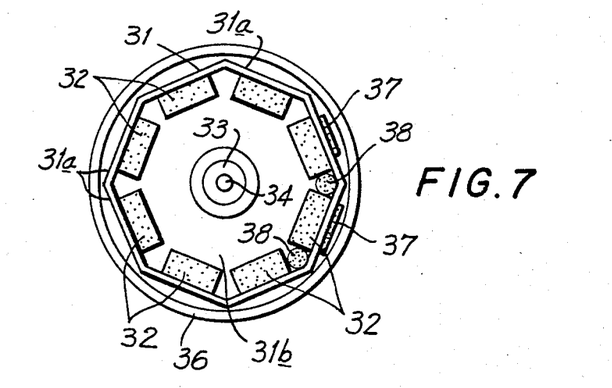
FIG. 7 is a plan view of a rotor assembly according to this invention with balancing weights attached to attain rotational dynamic balance of the rotor.

FIG. 7 shows an example of a rotor assembly 30 according to this invention wherein dynamic balancing of the rotor is achieved with balancing weights. In FIG. 7, elements in common with FIG. 3 are identified by the same reference numerals, and the detailed description thereof is omitted. In the rotor assembly 30 according to this invention, the rotor yoke 31 has an octagonal cross-section, so that eight sector-shaped spaces are provided between the flat side walls 31a and a cylindrical casing 36 which houses the rotor assembly 30. In this case, laminar weight members 37 can be attached to one or more of the side walls 31a on the surface thereof opposite to that on which the permanent magnet 32 is attached. Each such laminar weight member 37 can be easily attached to the outer surface of the rotor yoke 31, and the balancing operation can be easily automated. Further, as shown, a balancing weight 38 formed of a dense material, such as lead powder in mixture with plastic adhesive, can be deposited, at any one of the corners formed by the intersections of two adjacent flat side walls 31a, in the space formed between adjacent ones of the permanent magnets 32 attached to the flat side walls 31a.

In all of the above described and illustrated embodiments, this invention has been applied to an "outer rotor" type motor, that is, a motor in which the rotor assembly is disposed radially outside the stator armature. However, this invention can also be applied to an "inner rotor" type motor in which the stator armature is disposed radially outside the rotor assembly. In the case of an inner-rotor type motor, the flat permanent block magnets 32 are secured to the outer surface of the flat side walls of a rotor yoke of polygonal cross-section. In that case, the portions of each magnet 32 near the corners of the rotor yoke are disposed nearer to the stator armature, and the gap length between the rotor and stator is decreased near the corners but increased near the central portion of each magnet 32. Thus, in an inner-rotor rotor assembly with a pole arrangement similar to that shown on FIG. 4A, the flux distribution will exhibit a trapezoidal form. That is, the peak of the sinusoidal flux density pattern of FIG. 4B will be somewhat flattened. In an inner-rotor assembly with a pole arrangement similar to that of the embodiment of FIG. 5A, the flux distribution will exhibit a trapezoidal form similar to that shown in FIG. 5B, but with flux density peaks at the ends and possibly at the center of the flat portions thereof. However, variations from the flat level will be negligible from most purposes. In an inner-rotor rotor assembly with a pole arrangement similar to that of the embodiment of FIG. 6A, the flux distribution will exhibit a trapezoidal form.

In the case of an inner-rotor type rotor assembly, spaces also occur between the stator armature and the outer flat surfaces of the magnets 32 which are themselves secured to the outer surfaces of the side walls of the rotor yoke, and laminar weight members similar to those indicated at 37 on FIG. 7 may be attached to the magnets within such spaces to achieve dynamic balancing.

Figure 8:
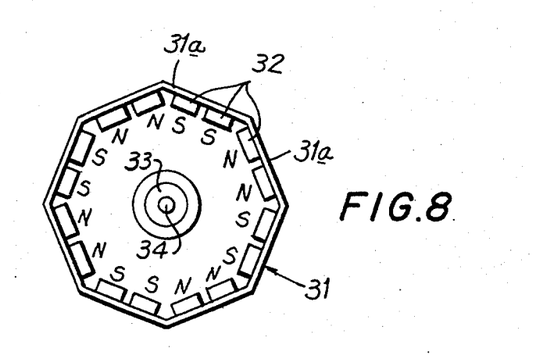
FIG. 8 is a plan view similar to that of FIG. 4A, but showing a modification of the rotor assembly there illustrated.

The present invention is not restricted to rotor yokes of octagonal cross-section. Thus, a rotor assembly according to this invention may be constructed in the form of any polygon having an even number of at least four sides. Any of the above-described embodiments can also be varied by providing several magnets 32 of the same polarity or of opposite polarity on each of the flat side walls 31a of the rotor yoke, for example, as shown on FIG. 8. Also, the number of rotor magnets attached to each of the flat side walls 31a can be changed in accordance with the diameter of the rotor assembly 30. Thus, a variety of sizes and types of DC brushless motors can be assembled using flat permanent magnets 32 of standardized size and shape.

Figure 9:
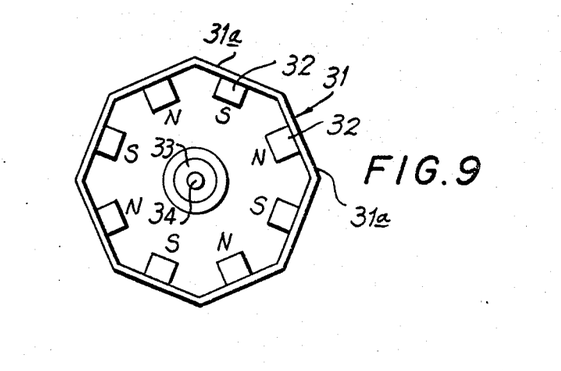
FIG. 9 is still another plan view similar to FIG. 4A, but showing another modification of the rotor assembly according to the invention.

In addition, the rotor assembly design may be varied by attaching flat block magnets 32 on alternating walls only, or on every third wall, rather than on each flat side wall of the rotor yoke, particularly when the rotor yoke is provided as a polygonal prism having a sufficiently large number of sides. Furthermore, the flat permanent magnets 32 can be slender, that is magnets which are longer in the axial direction than in the circumferential direction, in order to permit tailoring of the flux pattern of the rotor assembly to achieve a particular desired result. For instance, if each of such slender magnets 32 is attached to a substantially central portion of a respective flat side wall 31a as on FIG. 9, the rotor assembly will provide a flux density which shows an abrupt increase at the angular position corresponding to the center of a side wall of the polygonal rotor yoke, but which is reduced substantially to a zero level at the angular position corresponding to each of the corners of the polygonal rotor yoke.

The embodiments described above have employed a rotor yoke in the form of an octagonal cup drawn from iron or electrical steel. However, such a rotor yoke may be formed of a plastic synthetic resin molded with a mixture of ferromagnetic particles such as steel filings, iron dust, or the like. Also while the rotor yoke 31 described above is a prism of polygonal cross-section, a rotor yoke for a rotor assembly according to this invention could also be formed as a cylinder, so long as support members are provided to support the flat magnets in an array which is of substantially polygonal cross-section, and to provide a pathway for the magnetic flux of such flat magnets.

While several preferred embodiments of this invention and modifications thereof have been described in detail herein with reference to the accompanying drawings, it is apparent that the invention is not limited to those precise embodiments and specifically described modification, and that other modifications and variations are possible for a person of ordinary skill in the art without departing from the spirit and scope of the invention as defined in the appended claims.

What is claimed is:

1. In a DC brushless motor including a permanent magnet rotor assembly, a stator assembly having stator coils arranged in the magnetic field generated by said permanent magnet rotor assembly, and means for controlling energization of said stator coils so as to impart a rotational torque to said rotor assembly; said rotor assembly comprising a plurality of flat permanent magnets each having a flat side facing said stator coils across an air gap free of magnetic material and rotor yoke means having a substantially polygonal cross-section and a plurality of flat side walls to which said flat permanent magnets are attached and providing a path for magnetic flux emanating from the side of said magnets remote from said stator coils whereby said plurality of magnets forms an array thereof which is substantially a regular polygon in cross-section.

2. A DC brushless motor according to claim 1; in which said flat permanent magnets are magnetized in the direction of anisotropic orientation.

3. A DC brushless motor according to claim 2; in which each said flat permanent magnet has opposed flat surfaces and is polarized so that magnetic flux flows into one of said flat surfaces thereof and out of the opposite flat surface, and said permanent magnets are arranged with said flat surfaces facing substantially radially with respect to the axis of rotation of said rotor assembly.

4. A brushless DC motor according to claim 1; further comprising a balancing weight fixed to said rotor yoke means for obtaining dynamic balance of said rotor.

5. A DC brushless motor according to claim 1; in which said rotor yoke means has an even number of at least four of said flat side walls.

6. A DC brushless motor according to claim 1; in which said rotor yoke means is octagonal in cross-section.

7. A DC brushless motor according to claim 1; in which said permanent magnets are arranged on said flat side walls of the rotor yoke means so that the flux distribution of the magnetic field of said rotor assembly varies substantially sinusoidally with respect to the angle of rotation of said rotor assembly.

8. A DC brushless motor according to claim 7; in which said coils of the stator assembly include two-phase windings circumferentially arranged about the axis of rotation of said rotor assembly so as to have a phase difference of an odd multiple of $\pi/2$ in electrical angle, and said means for controlling energization of said coils detects the angular position of said rotor assembly and causes a drive current in said windings to vary sinusoidally in correspondence with the substantially sinusoidal variations of flux of said rotor assembly.

9. A DC brushless motor according to claim 7; in which each of said permanent magnets has opposed flat sides and is magnetized so that magnetic flux flows substantially uniformly from one of said flat sides into the opposite flat side, thereby providing a north pole at said one flat side and a south pole at said opposite flat side thereof, said permanent magnets are arranged with said flat sides facing substantially radially with respect to the axis of rotation of said rotor assembly, and said permanent magnets are arranged with north poles facing toward the axis of rotation of the rotor assembly on every other flat side wall of said rotor yoke means and with south poles facing toward the axis of rotation of the rotor assembly on the remaining flat side walls of said rotor yoke means.

10. A DC brushless motor according to claim 1; in which said permanent magnets are arranged on said flat side walls of the rotor yoke means so that the flux distribution of the magnetic field of said rotor assembly is substantially constant over predetermined angular ranges with respect to the angle of rotation of said rotor assembly.

11. A DC brushless motor according to claim 10; in which at least portions of said permanent magnets contiguous with opposite sides of at least certain corners formed by intersections of said flat walls of the rotor yoke means are of like magnetic polarity, and each said angular range is centered in respect to the angular position of a respective one of said corners.

12. A DC brushless motor according to claim 11; in which each of said permanent magnets has opposed flat sides and is magnetized so that the magnetic flux flows substantially uniformly from one of said flat sides into the opposite flat side thereby providing a north pole at said one flat side and a south pole at said opposite flat side, and said permanent magnets are arranged on the flat side walls of said rotor yoke means so that pairs of permanent magnets of one polarity, arranged with each magnet of each said pair on a respective one of two consecutive flat walls, alternate with pairs of permanent magnets of the other polarity which are arranged on the next consecutive two flat walls, respectively, so that each said predetermined angular range is centered at an angular position between magnets of each pair of like polarity.

13. A DC brushless motor according to claim 11; in which said permanent magnets are arranged so that the polarity of said magnets is reversed at each corner in succession and said magnetic field generated by said rotor assembly varies substantially rectangularly with respect to the angle of rotation of said rotor assembly.

14. A DC brushless motor according to claim 13; in which each said permanent magnet consists of two flat permanent magnet portions formed integrally with each other, with one of said portions nearest one corner of said rotor yoke means having a north magnetic polarization and the other of said portions nearest the next corner of said rotor yoke means having a south magnetic polarization.

15. A DC brushless motor according to claim 10; in which said coils include plural-phase windings circumferentially arranged about the axis of rotation of said rotor assembly at positions corresponding to a predetermined phase difference, and said means for controlling energization of said coils energizes said coils when the rotational position of said rotor is within said predetermined angular range.

16. A DC brushless motor according to claim 1; in which a plurality of permanent magnets are arranged circumferentially on each of the flat side walls of said rotor yoke means.

17. A DC brushless motor according to claim 1; in which each of said permanent magnets is longer in the axial direction than in the circumferential direction, and each of said permanent magnets is attached at a substantially central position of a respective flat side wall.

18. A brushless DC motor according to claim 1; in which a balancing weight is attached to a side of one of said flat side walls opposite the side thereof on which a respective one of said permanent magnets is attached.

19. A brushless DC motor according to claim 1; in which a balancing weight for obtaining dynamic balance of said rotor assembly is attached between adjacent ones of said permanent magnets attached to said side walls.

20. A brushless DC motor according to claim 19; in which said balancing weight is attached at a corner formed by the intersection of two adjacent flat side walls.

* * * * *